United States Patent [19]
Lischer et al.

[11] Patent Number: 6,105,436
[45] Date of Patent: Aug. 22, 2000

[54] CAPACITIVE PRESSURE TRANSDUCER WITH IMPROVED ELECTRODE SUPPORT

[75] Inventors: D. Jeffrey Lischer, Acton; Steven D. Blankenship, Melrose, both of Mass.

[73] Assignee: MKS Instruments, Inc., Andover, Mass.

[21] Appl. No.: 09/360,308

[22] Filed: Jul. 23, 1999

[51] Int. Cl.[7] .................................. G01L 9/12; H01G 7/00
[52] U.S. Cl. ............................ 73/724; 73/718; 361/283.4
[58] Field of Search .............................. 73/715, 724, 718, 73/756; 361/283.4

[56] References Cited

U.S. PATENT DOCUMENTS

| | | | |
|---|---|---|---|
| 4,433,580 | 2/1984 | Tward | 73/718 |
| 5,155,653 | 10/1992 | Kremidas | 361/283 |
| 5,911,162 | 6/1999 | Denner | 73/718 |

*Primary Examiner*—Eric S. McCall
*Assistant Examiner*—Abdullahi Aw-Musse
*Attorney, Agent, or Firm*—Hale and Dorr LLP

[57] ABSTRACT

The disclosed pressure transducer assembly includes a body, a diaphragm, an insulating member, a conductor, a compressed member, and a support member. The body defines an interior cavity. The diaphragm is mounted in the body and divides the interior cavity into a first chamber and a second chamber. A portion of the diaphragm moves in a first direction in response to a pressure in the first chamber being greater than a pressure in the second chamber, and that portion of the diaphragm moves in a second direction opposite the first direction in response to the pressure in the second chamber being greater than the pressure in the first chamber. The conductor is disposed on the insulating member. The insulating member is disposed within the first chamber so that the conductor and the diaphragm form plates of a capacitor. The compressed member is disposed in the first chamber and generates a force that biases the insulating member towards the diaphragm. The support member is disposed between the diaphragm and the insulating member. The support member resists movement of the insulating member towards the diaphragm. The support member is characterized by a thickness and a cross-sectional width. The ratio of the thickness to the cross-sectional width is greater than one.

32 Claims, 10 Drawing Sheets

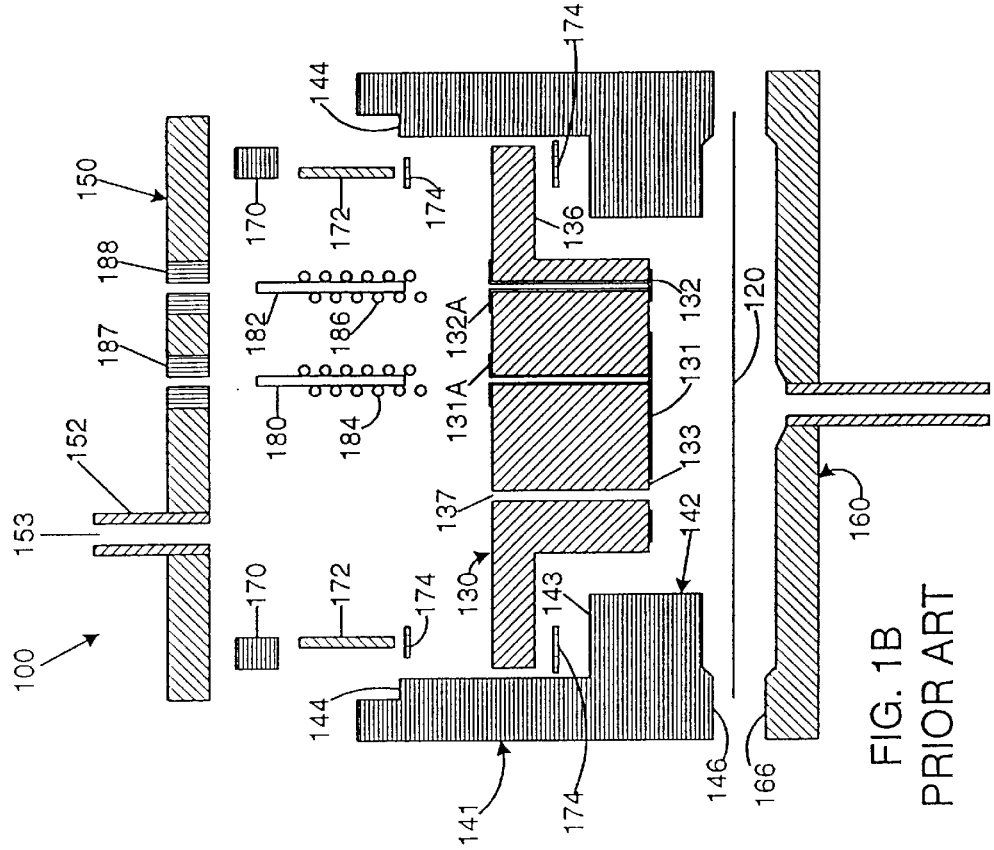
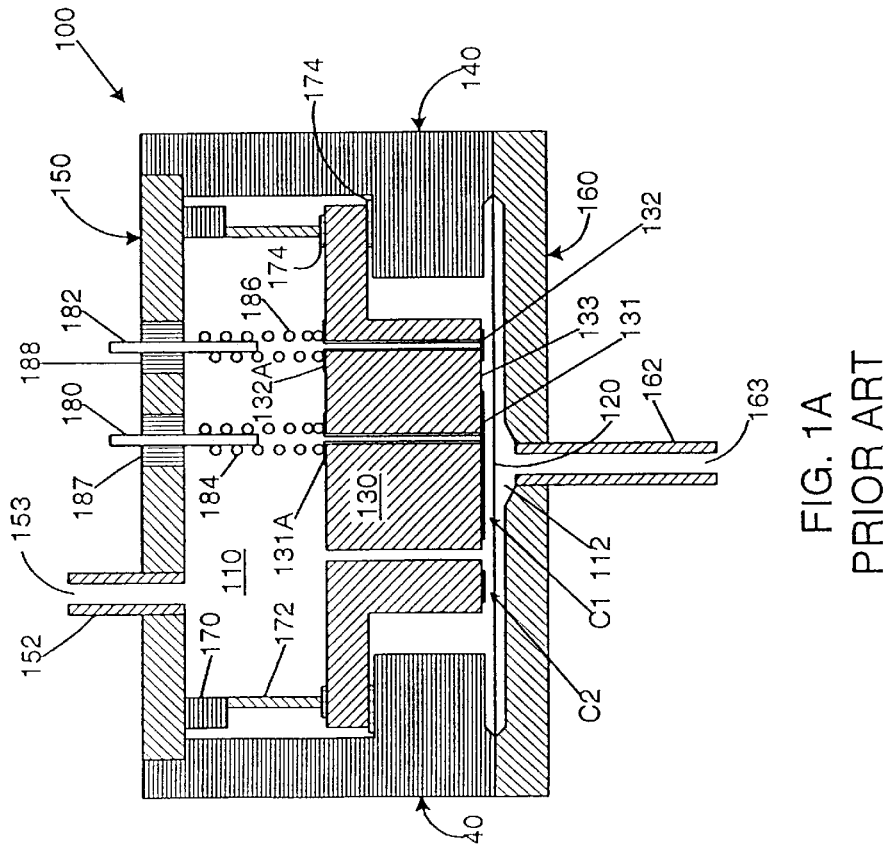
FIG. 1A PRIOR ART
FIG. 1B PRIOR ART

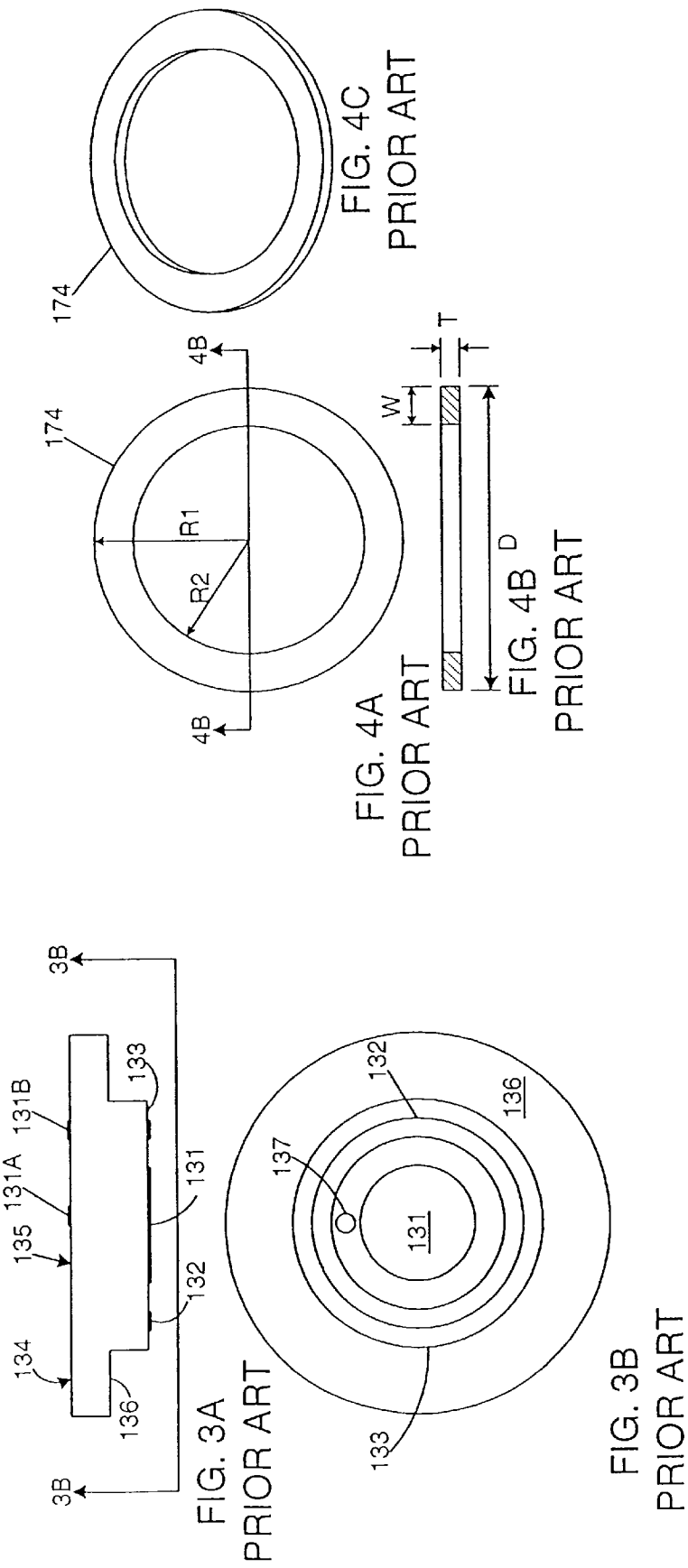

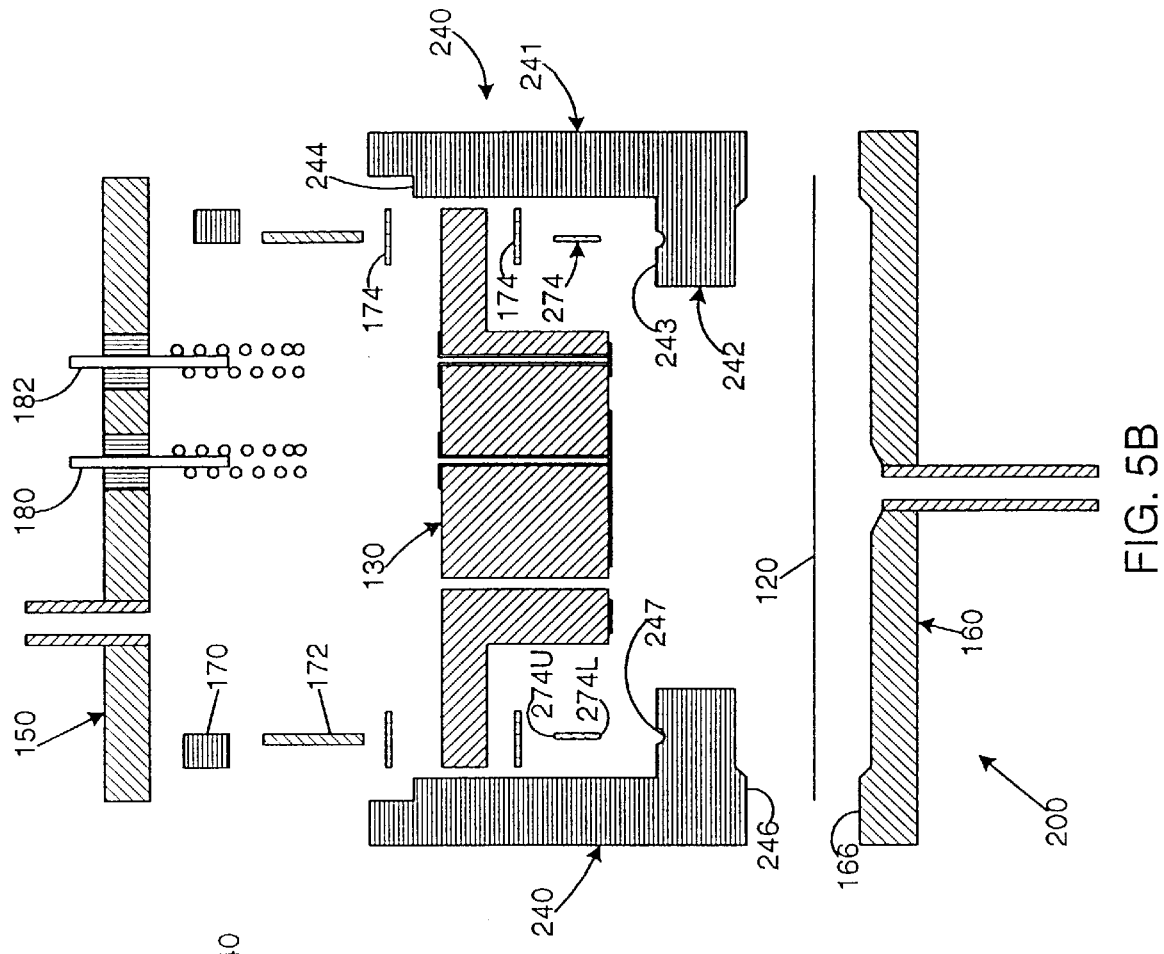
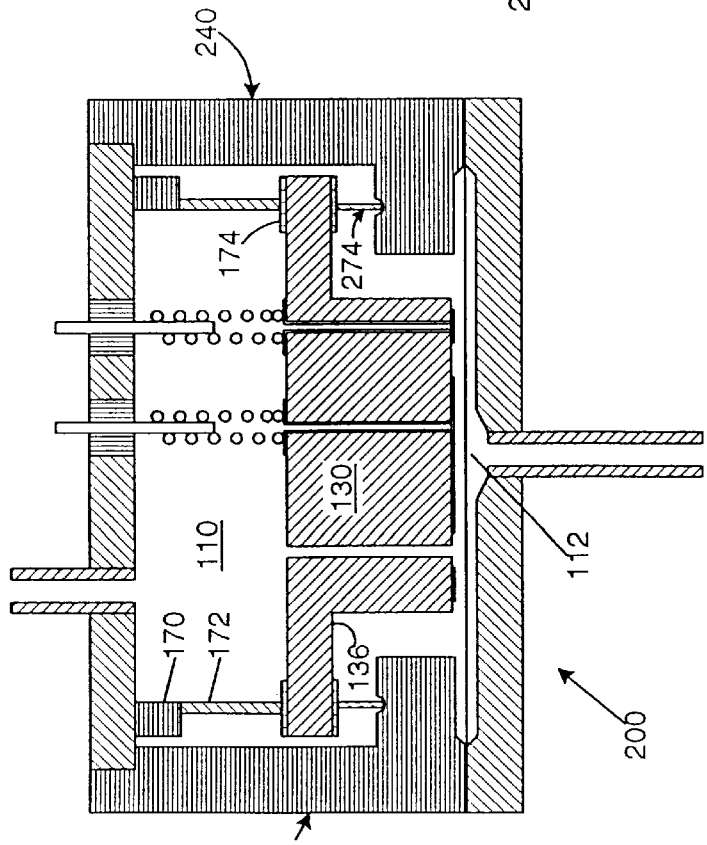
FIG. 5A
FIG. 5B

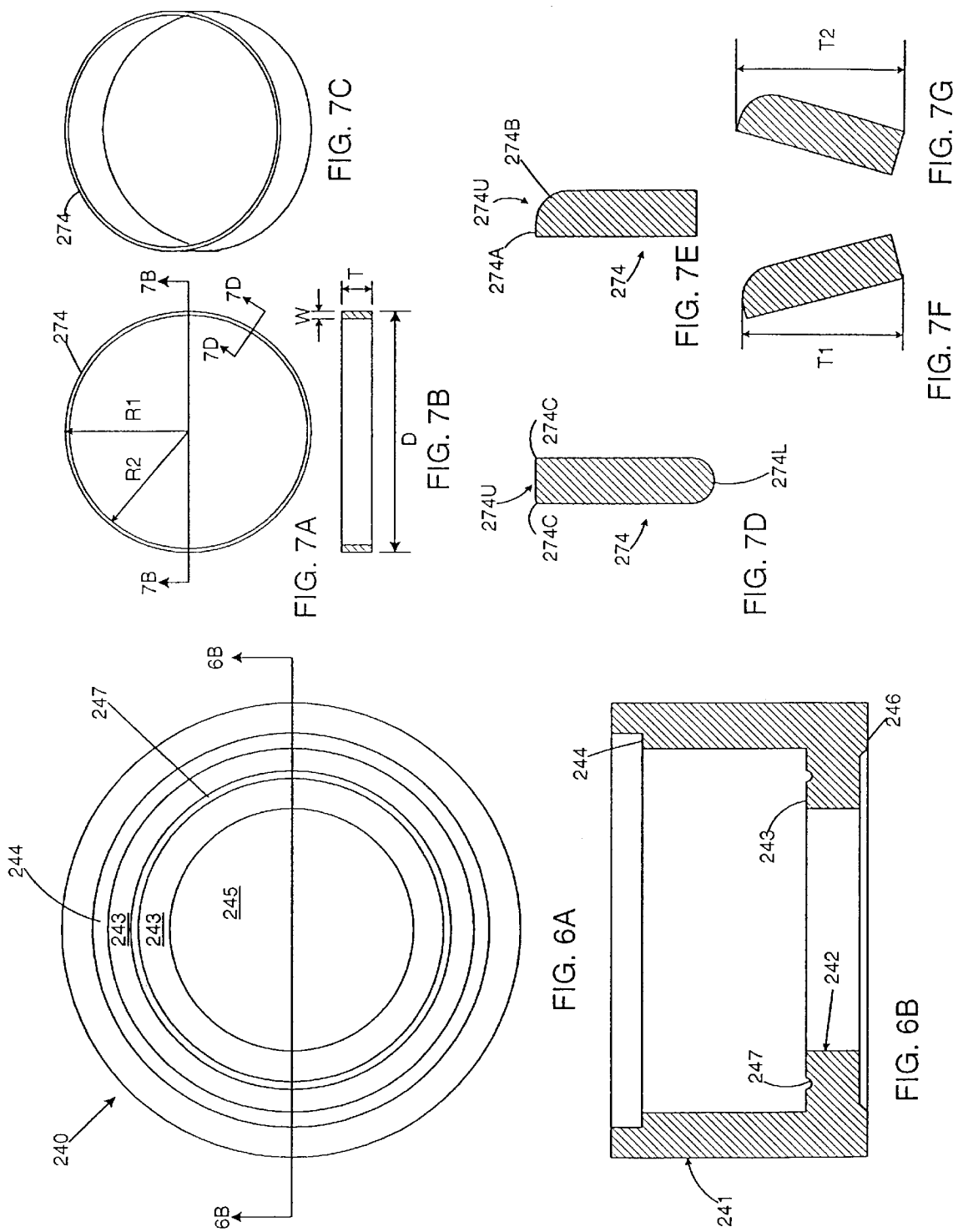

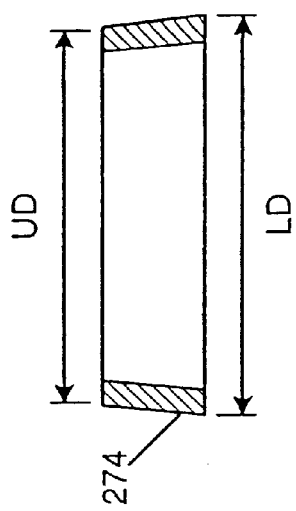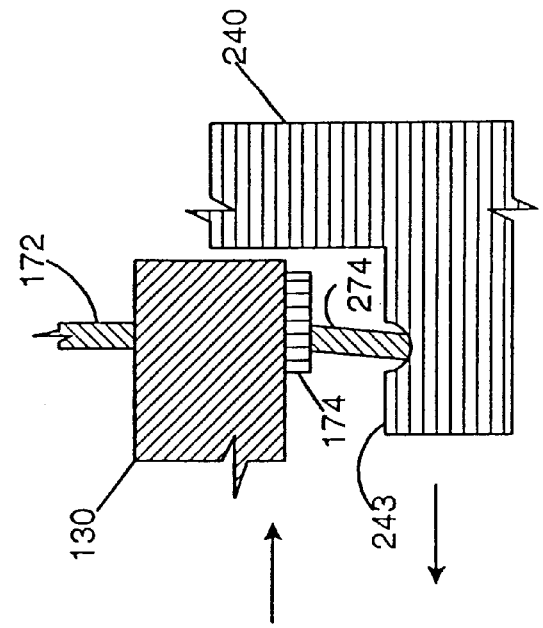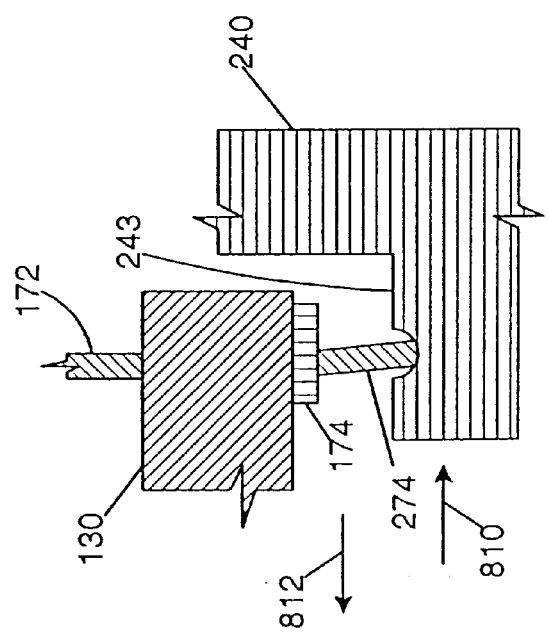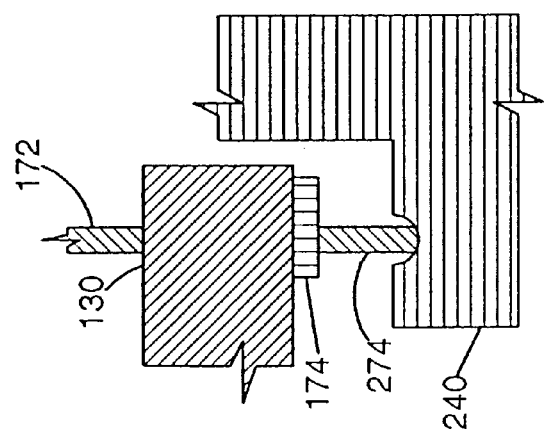

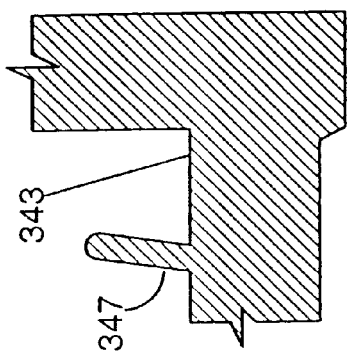
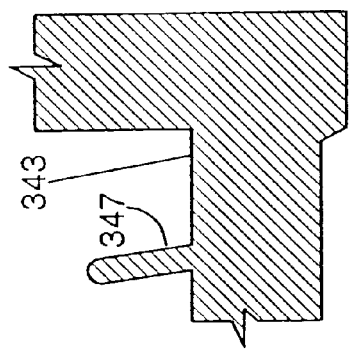
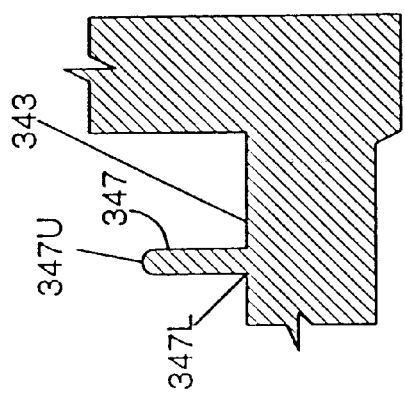
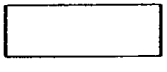 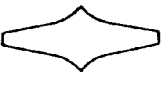
 
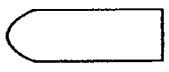

CAPACITIVE PRESSURE TRANSDUCER WITH IMPROVED ELECTRODE SUPPORT

BACKGROUND OF THE INVENTION

The present invention relates to capacitive pressure transducers. More specifically, the present invention relates to an improved apparatus for mounting an electrode in a capacitive pressure transducer.

FIG. 1A shows a partially sectional side view of an assembled prior art capacitive pressure transducer assembly 100. FIG. 1B shows an exploded partially sectional side view of transducer assembly 100. For convenience of illustration, FIGS. 1A and 1B, as well as other figures in the present disclosure, are not drawn to scale. Also, shading has been used to facilitate understanding of the drawings, however, shading has not been used to indicate the materials from which various components illustrated in the drawings are manufactured.

Briefly, transducer assembly 100 includes a body that defines an interior cavity. A relatively thin, flexible, conductive, diaphragm 120 divides the interior cavity into a first sealed interior chamber 110 and a second sealed interior chamber 112. As will be discussed in greater detail below, diaphragm 120 is mounted so that it flexes, moves, or deforms, in response to pressure differentials in chambers 110 and 112. Transducer assembly 100 provides a parameter that is indicative of the amount of diaphragm flexure and this parameter is therefore indirectly indicative of the differential pressure between chambers 110 and 112. The parameter provided by transducer assembly 100 indicative of the differential pressure is the electrical capacitance between diaphragm 120 and one or more conductors disposed on a ceramic electrode 130.

Transducer assembly 100 includes a metallic housing 140, a metallic top cover 150, and a metallic bottom cover 160. Housing 140, upper cover 150, and diaphragm 120 cooperate to define the first interior sealed chamber 110. Diaphragm 120 defines the bottom, housing 140 defines the sidewalls, and upper cover 150 defines the top of chamber 110. The upper cover 150 includes a metallic pressure tube 152 that defines a central aperture 153. Aperture 153 provides an inlet or entry way into chamber 110. As will be discussed below, electrode 130 is housed in chamber 110 and electrode 130 does not prevent the pressure of a fluid in inlet 153 from being communicated, or applied, to the upper surface of diaphragm 120.

The lower cover 160 and the diaphragm 120 cooperate to define the second interior sealed chamber 112. Diaphragm 120 defines the top, and lower cover 160 defines the bottom, of chamber 112. The lower cover 160 also includes a metallic pressure tube 162 that defines a central aperture 163. Aperture 163 provides an inlet or entry way into chamber 112. The pressure of fluid in aperture 163 is communicated to the lower surface of diaphragm 120.

Electrode 130 includes two metallic conductors 131, 132 disposed on a lower surface 133 of the electrode 130. Conductor 131 and diaphragm 120 form parallel plates of a first capacitor C1. Similarly, conductor 132 and diaphragm 120 form parallel plates of a second capacitor C2. As is well known, $C = A\epsilon_r\epsilon_0/d$, where C is the capacitance between two parallel plates, A is the common area between the plates, $\epsilon_0$ is the permittivity of a vacuum, $\epsilon_r$ is the relative permittivity of the material separating the plates ($\epsilon_r = 1$ for vacuum), and d is the axial distance between the plates (i.e., the distance between the plates measured along an axis normal to the plates). So, the capacitance provided by capacitors C1 and C2 is a function of the axial distance between diaphragm 120 and conductors 131 and 132, respectively. As the diaphragm 120 moves or flexes up and down, in response to changes in the pressure differential between chambers 110 and 112, the capacitances provided by capacitors C1 and C2 also change. At any instant in time, the capacitances provided by capacitors C1 and C2 are indicative of the instantaneous differential pressure between chambers 110 and 112. Known electrical circuits (e.g., a "tank" circuit characterized by a resonant frequency that is a function of the capacitance provided by capacitor C1 or C2) may be used to measure the capacitance provided by capacitors C1 and C2 and to provide an electrical signal representative of the differential pressure.

Some mechanical details of transducer assembly 100 will now be discussed. FIG. 2A shows a top view of housing 140 and FIG. 2B shows a sectional view of housing 140 taken in the direction indicated by the line 2B—2B as shown in FIG. 2A. Referring to FIGS. 1B, 2A, and 2B, it can be seen that housing 140 has a tubular configuration, and the walls of housing 140 are generally L-shaped. The L-shaped walls of housing 140 include a vertically extending portion 141 (defining the vertical portion of the L-shape) and a horizontally extending portion 142 (defining the horizontal portion of the L-shape). The horizontally extending portion 142 defines an annular upper surface 143 that acts as first support shoulder. The upper surface of the vertically extending portion 141 is stepped so that the housing 140 also defines a second annular support shoulder 144. Housing 140 also defines a central aperture, or through hole, 145 and an annular bottom support surface 146.

Referring again to FIGS. 1A and 1B, the upper cover 150 is circular. When transducer 100 is assembled, the outer periphery of the lower surface of upper cover 150 rests on the second support shoulder 144 of the housing 140. The upper cover 150 and the housing 144 are joined (normally by welding) to form an air tight seal between the two parts.

The lower cover 160 is also circular. Lower cover 160 defines an annular upper surface 166 that extends around the outer periphery of lower cover 160. The housing 140, diaphragm 120, and lower cover 160 are joined (normally by welding) together (1) so that the outer periphery of the diaphragm is trapped between the lower surface 146 of housing 140 and the upper surface 166 of lower cover 160; (2) so that an air tight seal is formed between diaphragm 120 and the lower cover 160, thereby sealing interior chamber 112; and (3) so that an air tight seal is formed between diaphragm 120 and housing 140, thereby sealing interior chamber 110.

Electrode 130 is fabricated from a rugged, rigid, electrically insulating (or nonconductive), material. Normally, electrode 130 is fabricated from a ceramic such as Alumina or Fosterite. Electrode 130 has a generally cylindrical shape. FIG. 3A shows a side view of electrode 130. FIG. 3B shows a bottom view of electrode 130 taken in the direction indicated by arrow 3B—3B as shown in FIG. 3A. Electrode 130 includes a relatively thin cylindrical outer section 134 and a thicker cylindrical central section 135. The outer section 134 defines an annular lower surface, or shoulder, 136 that extends around the outer periphery of the electrode 130. The central section 135 defines the planar, circular, lower surface 133 and the two conductors 131, 132 are disposed on the lower surface 133. As shown in FIGS. 1A, 1B, and 3A, conductor 131 includes a portion 131A that extends through a plated-through hole and connects to an upper surface of electrode 130. Similarly, conductor 132 includes a portion 132A that extends through another plated-through hole and connects to the upper surface of electrode 130. Electrode 130 is normally positioned within chamber 110 so that the space between conductors 131, 132 and diaphragm 120 is relatively small (e.g., on the order of 0.006 inches). The electrode 130 is also positioned so that the conductors 131, 132 are disposed in a plane that is parallel to the plane defined by the diaphragm 120 when the pressures in chambers 110, 112 are equal.

An aperture, or through hole, 137 extends entirely through the central portion 135 of electrode 130 at a location between the two conductors 131, 132. Aperture 137 permits the pressure of a fluid in inlet 153 to be applied to the upper surface of the diaphragm.

Housing 140 supports electrode 130 within the chamber 110. The lower shoulder 136 of electrode 130 essentially rests on the shoulder 143 defined by the horizontally extending portion 142 of housing 140.

Transducer assembly 100 also includes a wave washer 170 (i.e., a metallic, annular, washer that has been bent in one or more places in directions perpendicular to the plane of the ring) and a force transfer member 172. The wave washer 170 is disposed between the upper cover 150 and the transfer member 172, and the transfer member 172 is disposed between the wave washer 170 and the electrode 130. When the upper cover 150 is attached to the housing 140 (as shown in FIG. 1A), the wave washer 170 is sufficiently compressed to generate about 100 to 200 pounds of force. This force is communicated via the transfer member 172 to the electrode 130 and pushes the electrode down towards the diaphragm 120. The shoulder 143 of housing 140 supports the electrode 130 and resists movement of the electrode 130 towards the diaphragm 120. The large force generated by the wave washer essentially pushes the electrode onto the housing and holds the electrode 130 securely in place with respect to the housing 140.

During normal operating conditions, the diaphragm 120 moves or flexes within the chambers 110, 112 and does not contact electrode 130. However, when the pressure in chamber 112 becomes excessive, the diaphragm may contact and push against electrode 130. This condition is commonly referred to as an "over pressure condition". The relatively large spring force generated by the compressed wave washer 170 prevents the electrode 130 from moving, or becoming unseated, during over pressure conditions.

Transducer assembly 100 also includes one or more shims 174 disposed between the lower surface 136 of electrode 130 and the shoulder 143 of housing 140, and also between the upper surface of the electrode 130 and the transfer member 172. These shims are normally included to adjust the spacing between the conductors 131, 132 and the diaphragm 120. FIG. 4A shows a top view of one of the shims 174. FIG. 4B shows a sectional view of shim 174 taken in the direction indicated by line 4B—4B as shown in FIG. 4A. FIG. 4C shows a perspective view of shim 174. As shown, the shim 174 is characterized by a relatively thin annular (or "flat washer") shape. Shim 174 is further characterized by the following parameters: an outer diameter D, a thickness T, and a cross-sectional width W. In the case of shim 174, the cross-sectional width W is equal to the difference between the radius R1 (i.e., the distance between the center and the outer perimeter of the shim) and the radius R2 (i.e., the distance between the center and the inner perimeter of the shim). A typical prior art shim has an outer diameter D equal to 1.8 inches, a thickness T equal to 0.006 inches, and a cross-sectional width W equal to 0.08 inches.

Referring again to FIGS. 1A and 1B, transducer assembly 100 also includes two conductive pins 180, 182 and two conductive springs 184, 186. The conductive pins 180 and 182 extend through upper cover 150 and are electrically insulated from cover 150 by insulating plugs (e.g., melted glass plugs) 187 and 188, respectively. One end of conductive spring 184 physically and electrically contacts conductor 131A (and therefore electrically couples to conductor 131). The other end of conductive spring 184 is mechanically and electrically connected to pin 180. Similarly, one end of conductive spring 186 physically and electrically contacts conductor 132A (and therefore electrically couples to conductor 132). The other end of conductive spring 186 is mechanically and electrically connected to pin 182. This arrangement permits external circuits outside of transducer assembly 100 to electrically couple to conductors 131 (via pin 180 and spring 184) and 132 (via pin 182 and spring 186). Since diaphragm 120 and housing 140 are both conductive (and since they are welded together), external circuits may electrically couple to diaphragm 120 simply by coupling to housing 140. In practice, the body of transducer assembly 100 is normally grounded (thereby grounding diaphragm 120), so the capacitance provided by capacitors C1 and C2 may be measured simply by electrically coupling external measuring circuits to pins 180, 182.

In operation, transducer assembly 100 is normally used as an absolute pressure transducer. In this form, chamber 110 is normally first evacuated by applying a vacuum pump (not shown) to pressure tube 152. After chamber 110 has been evacuated, tube 152 is then sealed, or "pinched off" to maintain the vacuum in chamber 110. This creates a "reference" pressure in chamber 110. Although a vacuum is a convenient reference pressure, other reference pressures can be used. After the reference pressure has been established in chamber 110, the pressure tube 162 is then connected to a source of fluid (not shown) to permit measurement of the pressure of that fluid. Coupling the pressure tube 162 in this fashion delivers the fluid, the pressure of which is to be measured, to chamber 112 (and to the lower surface of diaphragm 120). The center of diaphragm 120 moves or flexes up or down in response to the differential pressure between chambers 110 and 112 thereby changing the capacitance of capacitors C1 and C2. Since the instantaneous capacitance of capacitors C1 and C2 is indicative of the position of the diaphragm 120, transducer assembly 100 permits measurement of the pressure in chamber 112 relative to the known pressure in chamber 110.

Transducer assembly 100 can of course also be used as a differential pressure transducer. In this form, pressure tube 152 is connected to a first source of fluid (not shown) and pressure tube 162 is connected to a second source of fluid (not shown). Transducer assembly 100 then permits measurement of the difference between the pressures of the two fluids.

For transducer assembly 100 to operate properly, it is important to maintain a stable geometric relationship between the various components of the assembly, and in particular between the diaphragm 120 and the conductors 131, 132. In operation of transducer assembly 100, the diaphragm 120 of course moves up and down (in response to changes in differential pressure) thereby changing the spacing between diaphragm 120 and the conductors. However, for transducer assembly 100 to provide consistently accurate readings, it is important to insure that the geometric relationship between the diaphragm 120 and the conductors 131, 132 remains constant over a long period of time for any particular differential pressure. Also, when manufacturing large numbers of transducer assemblies, it is important to provide the same geometric relationships in each assembly. By way of example, important characteristics of this geometric relationship include (1) the axial distance between the conductors and the diaphragm for any particular pressure; (2) the shape of the electrode 130 (e.g., tilting or warping of the electrode 130 will affect the spatial relationship between the diaphragm and the conductors); and the amount of tension on the diaphragm. For convenience of exposition, the geometric relationships between the various parts of the transducer assembly shall be referred to herein simply as the "geometric configuration". One problem with prior art transducer assembly 100 has been maintaining a stable geometric configuration.

Prior art transducer assembly 100 relies principally upon wave washer 170 and shims 174 to maintain a stable, desired, geometric configuration. Shims 174 are used to tune or adjust the distance between the diaphragm 120 and the conductors when the assembly 100 is assembled. After the transducer assembly is assembled, the large force generated by the wave washer 170 holds electrode 130 in a fixed position and thereby attempts to maintain a constant geometric configuration.

Although transducer assembly 100 holds the electrode 130 securely, the geometric configuration can vary by small amounts over time in response to, for example, temperature changes. The thermal coefficient of expansion for the metallic housing 140 is typically larger than the thermal coefficient of expansion for the ceramic electrode 130. Therefore, heating or cooling the transducer assembly can generate shear forces within the assembly that affect the geometric configuration. Mechanical stress can build up in the assembly in response to heating or cooling, and when the stress gets large enough, the electrode and the housing will move relative to one another to release the stress. This type of movement is sometimes referred to as "stickslip" or "mechanical hysteresis". These stick-slip movements affect the geometric configuration and can adversely affect the accuracy of the transducer assembly 100.

The performance of transducer assembly 100 may be characterized by at least two parameters. The first parameter is "stability", and the second parameter is "repeatability". Since the geometric configuration of transducer assembly 100 can change over time in response to heating or cooling, the transducer assembly 100 is susceptible to poor "stability". Both heating and cooling can cause changes in the geometric configuration. However, cycles of heating and cooling will not generally produce corresponding, repeatable, shifts in the geometric configuration. For example, if a transducer assembly at an original temperature, characterized by an original geometric configuration, is heated enough to cause a shift in the geometric configuration, and the assembly is then cooled back to the original temperature, the geometric configuration will not generally return to the original configuration. Rather, the assembly will normally now be characterized by a new geometric configuration. In other words, the variation in the geometric configuration caused by temperature shifts is characterized by mechanical hysteresis. This mechanical hysteresis is in general caused by non-conservative effects such as friction. Since changes in the geometric configuration are characterized by this hysteresis, the transducer assembly has relatively poor "repeatability".

U.S. Pat. No. 5,271,277 discloses one apparatus that attempts to maintain a stable geometric relationship between the conductor and the diaphragm over time. As shown by FIGS. 1–4 of that patent, in that apparatus the electrode is connected to the housing via an annular support member. One end of the annular support member is welded to a flexible portion of the housing. The other end of the annular support member is bonded, such as by glass frete bonding material, to the electrode. Rather than using a large spring force (e.g., such as that generated by a wave washer) to push the electrode securely against the housing, this apparatus uses the annular support member to isolate the electrode from the housing. In fact, the annular support member provides the only support for the electrode. This apparatus tends to isolate the electrode from some of the thermal expansion forces generated within the housing. However, this apparatus is complicated to build and lacks ruggedness. At least one problem with this apparatus relates to the glass frete bond between the annular support member and the electrode. Such bonds are difficult to fabricate and are also relatively fragile.

U.S. Pat. No. 4,823,603 discloses another apparatus for maintaining stable geometric relationships over time. As shown by FIGS. 10–15 of that patent, in that apparatus roller bearings are disposed between the electrode and the housing. A spring force is used to prevent the electrode from moving in a direction perpendicular to the diaphragm and the roller bearings permit the electrode to move in a direction parallel to the diaphragm. The movement permitted by the roller bearings prevents thermal stress from warping the electrode or from causing a "stick slip" type movement. In this apparatus, it is difficult to use large spring forces, so a relatively small spring force is typically used. The small spring force renders the apparatus unable to tolerate a large over pressure condition. That is, a relatively large over pressure condition can unseat the electrode and thereby alter the geometric configuration.

It is an object of the present invention to provide a pressure transducer assembly with an improved mounting for the electrode.

SUMMARY OF THE INVENTION

The invention is directed to an improved mounting for an electrode in a pressure transducer assembly. Transducer assemblies constructed according to the invention are characterized by improved stability and repeatability, and also provide a high degree of tolerance for over pressure conditions.

In one aspect, the improved mounting for the electrode includes an independent compliant ring characterized by an annular shape and having an aspect ratio greater than or equal to two. The housing of the transducer assembly may include an annular groove for locating the lower end of the compliant ring.

In another aspect, the improved mounting includes an annular integrated compliant ring that is formed as an integral part of the transducer assembly's housing.

One transducer assembly constructed according to the invention includes a body, a diaphragm, an insulating member, a conductor, a compressed member, and a support member. The body defines an interior cavity. The diaphragm is mounted in the body and divides the interior cavity into a first chamber and a second chamber. A portion of the diaphragm moves in a first direction in response to a pressure in the first chamber being greater than a pressure in the second chamber, and that portion of the diaphragm moves in a second direction opposite the first direction in response to the pressure in the second chamber being greater than the pressure in the first chamber. The conductor is disposed on the insulating member. The insulating member is disposed within the first chamber so that the conductor and the diaphragm form plates of a capacitor. The compressed member is disposed in the first chamber and generates a force that biases the insulating member towards the diaphragm. The support member is disposed between the diaphragm and the insulating member. The support member resists movement of the insulating member towards the diaphragm. The support member is characterized by a thickness and a cross-sectional width. The ratio of the thickness to the cross-sectional width is greater than two.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein:

FIG. 1A shows a partially sectional view of an assembled prior art pressure transducer assembly;

FIG. 1B shows a partially sectional exploded view of the assembly shown in FIG. 1A;

FIG. 3A shows a side view of the electrode of the assembly shown in FIGS. 1A and 1B;

FIG. 3B shows a bottom view of the electrode taken in the direction indicated by the line 3B—3B as shown in FIG. 3A;

FIG. 4A shows a top view of one of the shims of the assembly shown in FIGS. 1A and 1B;

FIG. 4B shows a sectional view of the shim taken in the direction indicated by the line 4B—4B as shown in FIG. 4A;

FIG. 4C shows a perspective view of the shim shown in FIG. 4A;

FIG. 5A shows a partially sectional view of an assembled pressure transducer assembly constructed according to the invention;

FIG. 5B shows a partially sectional exploded view of the transducer assembly shown in FIG. 5A;

FIG. 6A shows a top view of the housing of the assembly shown in FIGS. 5A and 5B;

FIG. 6B shows a sectional view of the housing taken in the direction indicated by line 6B—6B as shown in FIG. 6A;

FIG. 7A shows a top view of the independent compliant ring of the assembly shown in FIGS. 5A and 5B;

FIG. 7B shows a sectional view of the independent compliant ring taken in the direction indicated by line 7B—7B as shown in FIG. 7A;

FIG. 7C shows a perspective view of the independent compliant ring shown in FIG. 7A;

FIG. 7D shows a partially sectional magnified view of the independent compliant ring taken in the direction indicated by the line 7D—7D as shown in FIG. 7A;

FIG. 7E shows a partially sectional magnified view of an alternate embodiment of the independent compliant ring taken in the direction indicated by the line 7D—7D as shown in FIG. 7A;

FIG. 9A shows a magnified view of a small portion of the electrode, shim, independent compliant ring, and housing of the transducer assembly shown in FIGS. 5A and 5B;

FIGS. 9B and 9C show magnified views of the components shown in FIG. 9A illustrating how the independent compliant ring can tilt (or deform) back and forth in response to temperature induced differential expansions within the transducer assembly;

FIG. 10 shows a sectional view of an independent compliant ring constructed according to the invention that has deformed in response to temperature induced shear forces;

FIG. 12C shows a partially sectional magnified view of a portion of the housing taken in the direction indicated by line 12C—12C as shown in FIG. 12A;

FIGS. 13A and 13B show partially sectional magnified views of a portion of the housing shown in FIGS. 12A–12C illustrating how an integrated compliant ring constructed according to the invention can deform in response to temperature induced shear forces within the transducer assembly; and FIGS. 14A–14F show cross sectional views of portions of a variety of alternate embodiments of independent and integrated compliant rings constructed according to the invention.

DETAILED DESCRIPTION OF THE PREFERRED EMBODIMENTS

Figure 2A:
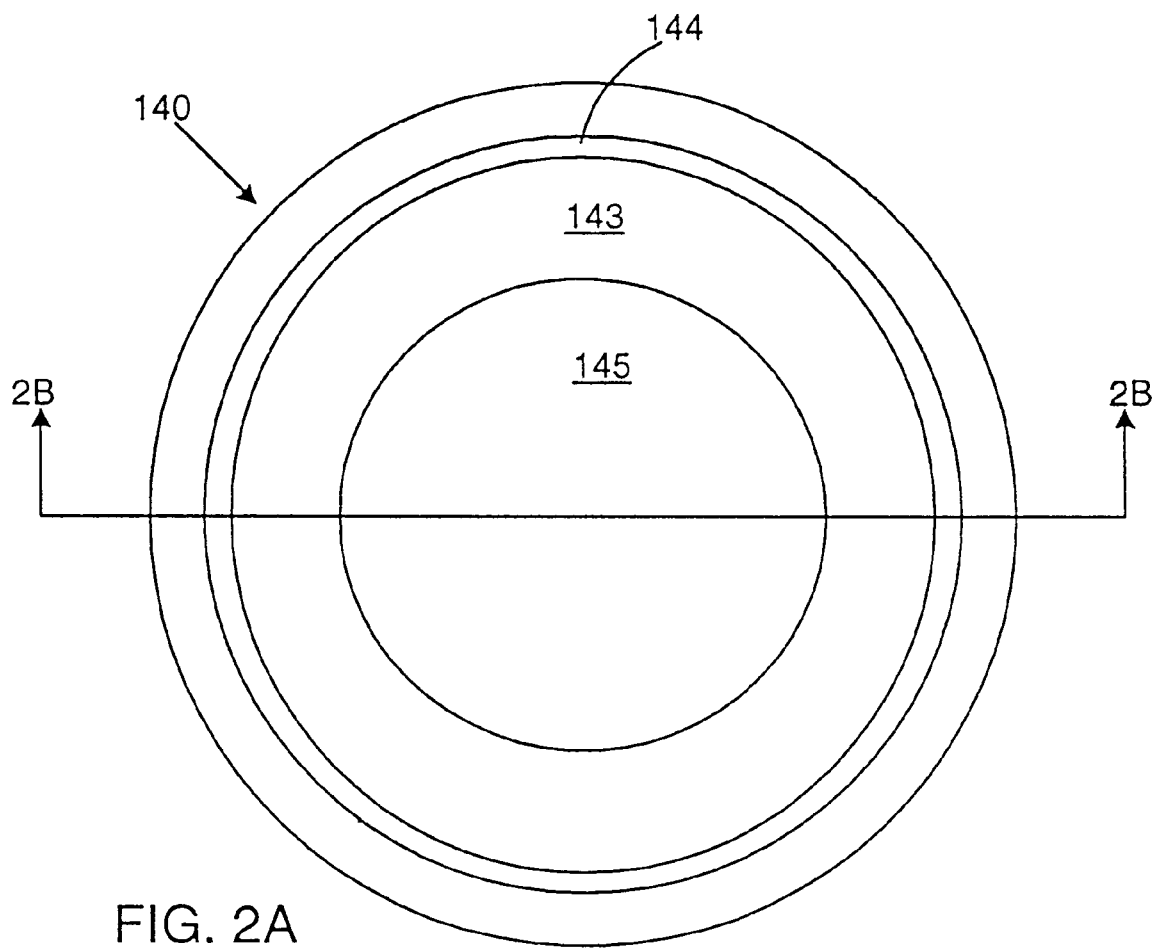
FIG. 2A shows a top view of the housing of the assembly shown in FIGS. 1A and 1B.
Figure 2B:
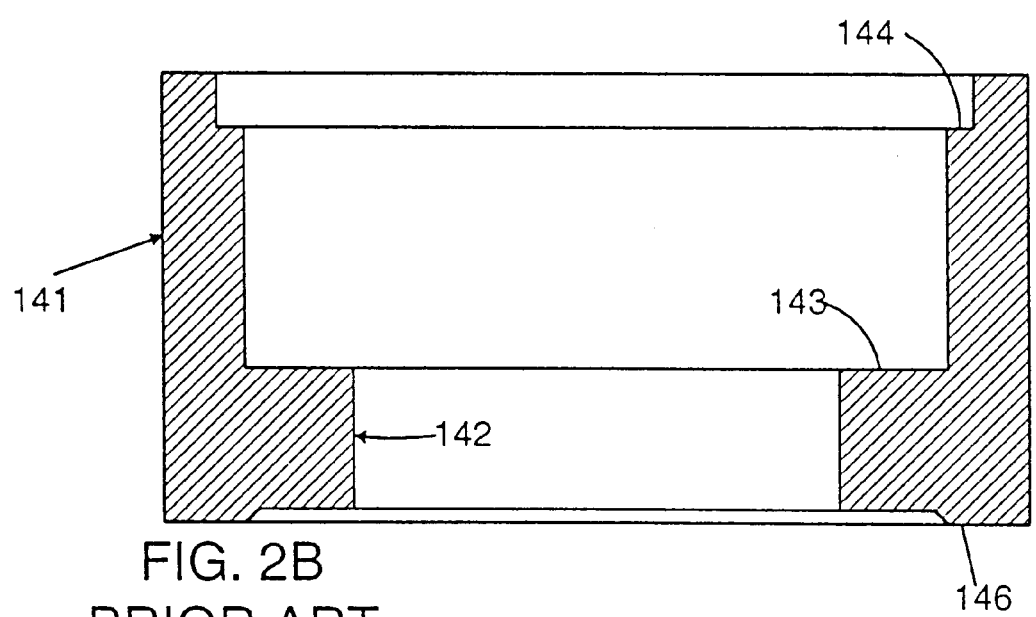
FIG. 2B shows a sectional view of the housing taken in the direction indicated by the line 2B—2B as shown in FIG. 2A.

FIG. 5A shows a partially sectional side view of an assembled transducer assembly 200 constructed according to the invention. FIG. 5B shows an exploded partially sectional view of transducer assembly 200. As will be discussed in greater detail below, transducer assembly 200 includes an independent compliant ring 274 and an improved housing 240. The compliant ring 274 and housing 240 cooperatively provide an improved support for the electrode 130.

As with prior art transducer assembly 100, assembly 200 defines an interior cavity and includes a diaphragm 120 disposed within the interior cavity. The diaphragm 120 divides the interior cavity into a first interior sealed chamber 110 and a second interior sealed chamber 112. Housing 240, top cover 150, and diaphragm 120 cooperate to define the first chamber 110. Diaphragm 120 and lower cover 160 define the second chamber 112.

FIG. 6A shows a top view of improved housing 240. FIG. 6B shows a sectional view of housing 240 taken in the direction indicated by line 6B—6B as shown in FIG. 6A. With reference to FIGS. 5A, 5B, 6A, and 6B, it can be seen that improved housing 240 bears several similarities to prior art housing 140. Namely, housing 240 has a tubular configuration and the walls of housing 240 are L-shaped. The L-shaped walls of housing 240 include a vertically extending portion 241 and a horizontally extending portion 242. An upper surface 243 of the horizontally extending portion 242 defines a first annular support shoulder. The upper surface of the vertically extending portion is stepped and defines a second annular support shoulder 244. Housing 240 also defines a central aperture 245. Unlike prior art housing 140, the first support shoulder 243 of housing 240 defines an annular groove 247. Housing 240 is metallic and is preferably formed from stainless steel or Inconel.

When transducer assembly 200 is assembled, the outer periphery of the lower surface of upper cover 150 rests on the second support shoulder 244 of housing 240. The upper cover 150 is joined (normally by welding) to the housing 240 to form an air tight seal. Also, when transducer assembly 200 is assembled, the housing 240, diaphragm 120, and lower cover 160 are joined (normally by welding) together (1) so that the outer periphery of the diaphragm 120 is trapped between a lower surface 246 of the housing and upper surface 166 of the lower cover 160; (2) so that an air tight seal is formed between diaphragm 120 and lower cover 160, thereby sealing interior chamber 112; and (3) so that an air tight seal is formed between diaphragm 120 and housing 240, thereby sealing interior chamber 110.

As with prior art assembly 100, assembly 200 includes a wave washer 170 and a force transfer member 172. Wave washer 170 and force transfer member 172 are disposed between top cover 150 and electrode 130 so that the compression force generated by wave washer 170 biases electrode 130 down towards the diaphragm 120. One or more shims 174 may also be disposed between force transfer member 172 and the upper surface of electrode 130.

As mentioned above, transducer assembly 200 also includes independent compliant ring 274. FIG. 7A shows a top view of independent compliant ring 274. FIG. 7B shows a sectional view of compliant ring 274 taken in the direction indicated by line 7B—7B as shown in FIG. 7A. FIG. 7C shows a perspective view of compliant ring 274. FIG. 7D shows a magnified partially sectional view of compliant ring 274 taken in the direction indicated by line 7D—7D as shown in FIG. 7A. Compliant ring 274 is characterized by an annular shape and by the following parameters: an outer diameter D, a thickness T, and a cross-sectional width W. The cross-sectional width W is equal to the difference between the radius R1 (i.e., the distance between the center and the outer perimeter of the compliant ring) and the radius R2 (i.e., the distance between the center and the inner perimeter of the compliant ring). One preferred embodiment of compliant ring 274 is fabricated from stainless steel and is characterized by an outer diameter D substantially equal to 1.8 inches, a thickness T substantially equal to 0.05 inches, and a cross-sectional width W substantially equal to 0.015 inches.

With reference to FIGS. 5A, 5B, 7A, 7B, 7C, and 7D, it can be seen that compliant ring 274 is disposed between improved housing 240 and electrode 130. More specifically, a lower end 274L of compliant ring 274 rests in groove 247 of housing 240. An upper end 274U of compliant ring 274 supports electrode 130. Surface 136 of the electrode 130 may rest directly on the upper end 274U of the compliant ring 274. Alternatively, as illustrated in FIGS. 5A and 5B, one or more shims 174 may be disposed between the upper end 274U of compliant ring 274 and the lower surface 136 of the electrode. The compliant ring 274 resists movement of electrode 130 towards diaphragm 120. The wave washer 170 and the compliant ring 274 cooperate to hold the electrode 130 in a stable position within housing 240. Whereas in the prior art, the shim 174 provided the only support between the electrode and the housing, in improved transducer assemblies constructed according to the invention, a compliant ring is disposed between the housing and the electrode.

Figure 8A:
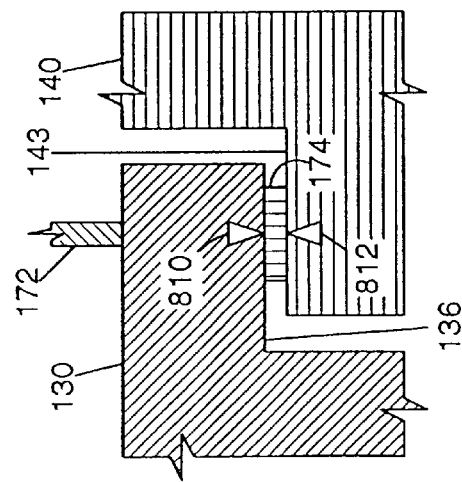
FIG. 8A shows a magnified view of a small portion of the electrode, shim, and housing of the prior art transducer assembly shown in FIGS. 1A and 1B configured in a neutral configuration at an original temperature.

As will be discussed further below, compliant ring 274 solves a problem associated with prior art shims 174. FIGS. 8A–8E illustrate the problem with prior art shims 174. FIG. 8A shows a magnified view of a prior art configuration including shim 174 disposed between electrode 130 and housing 140. The triangle 810 identifies a reference point on electrode 130 and the triangle 812 identifies a corresponding reference point on shoulder 143. The configuration illustrated in FIG. 8A is considered a "neutral configuration" because the reference points identified by triangles 810, 812 are in line with each other and with the force transfer member 172. FIG. 8A can be considered as representing the configuration of transducer assembly 100 at an original temperature.

Figure 8B:
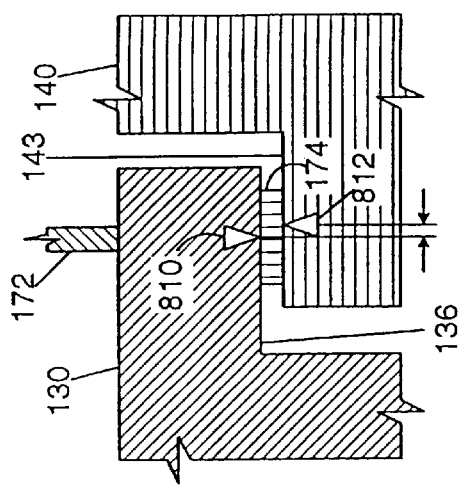
FIG. 8B shows the configuration produced by heating the assembly shown in FIG. 8A.

Since the coefficient of thermal expansion for the metallic housing 140 is typically greater than the coefficient of thermal expansion for the electrode 130, heating or cooling the transducer assembly can cause the housing, shim, and electrode to slide or slip relative to one another and thereby move away from the neutral configuration. Friction between the shim 174 and the electrode 130 and friction between the shim 174 and the housing 140 resist this tendency to slide. However, with sufficient heating or cooling of the assembly, the thermally induced shear forces eventually overcome the frictional resistance. When the shear forces overcome the frictional resistance, the electrode, shim, and housing slide against each other to a new position and thereby release the shear forces. FIG. 8B shows the configuration produced by heating the configuration shown in FIG. 8A until the electrode, shim, and housing slide against one another. As shown in FIG. 8B, the reference points identified by triangles 810, 812 are no longer in line with one another and the force transfer member 172.

Figure 8C:
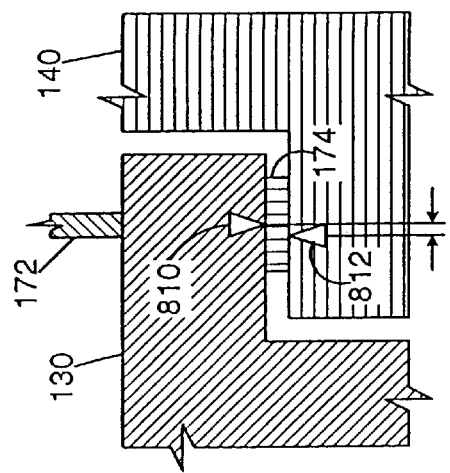
FIG. 8C shows the configuration produced by cooling the assembly shown in FIG. 8B down to the temperature of the configuration of the assembly shown in FIG. 8A.

If a transducer assembly in the configuration shown in FIG. 8B is then cooled down to the original temperature (i.e., the temperature of the assembly shown in FIG. 8A), different rates of thermal contraction generate shear forces that tend to make the housing and electrode return to their original configuration. However, friction tends to resist this movement and normally only allows the assembly to return part of the way towards the neutral configuration. FIG. 8C shows the configuration resulting from cooling the assembly shown in FIG. 8B down to the original temperature (i.e., the temperature of the assembly shown in FIG. 8A). As shown in FIG. 8C, after cooling down to the original temperature, the electrode 130 and housing 140 have normally not returned to the neutral configuration and instead the housing 140 is "outside" the neutral configuration (the housing 140 is said to be "outside" the neutral configuration because the diameter of the housing 140 measured at the reference point indicated by triangle 812 is greater than the diameter measured at the same reference point when the assembly is in the neutral configuration).

Figure 8D:
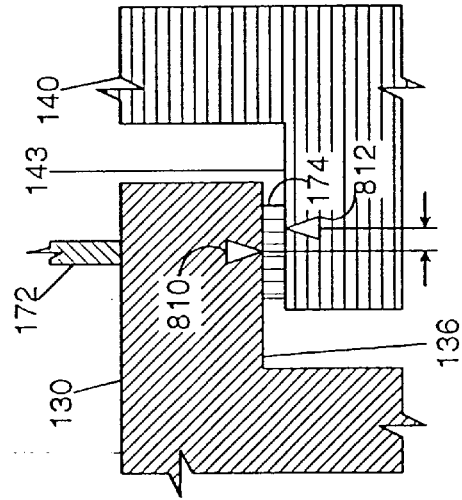
FIG. 8D shows the configuration produced by cooling the assembly shown in FIG. 8A.
Figure 8E:
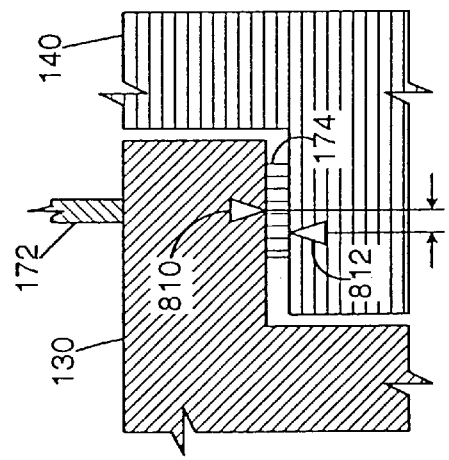
FIG. 8E shows the configuration produced by heating the assembly shown in FIG. 8D up to the temperature of the configuration of the assembly shown in FIG. 8A.

FIGS. 8A, 8B, and 8C illustrate the results of heating the transducer assembly and then cooling the assembly down to the original temperature. Similarly, FIGS. 8A, 8D, and 8E illustrate the results of cooling the transducer assembly and then heating the assembly up to the original temperature. FIG. 8D shows the results of cooling the assembly depicted in FIG. 8A until the housing and electrode move out of the neutral configuration. FIG. 8E shows the results of heating the assembly depicted in FIG. 8D back up to the original temperature. As shown in FIG. 8E, at the end of this temperature cycle of cooling followed by heating, the assembly has not returned to the neutral configuration. Rather, the housing 140 is "inside" the neutral configuration.

Ideally, after a temperature cycle of heating followed by cooling, or cooling followed by heating, the transducer assembly would return to the original geometric configuration once the assembly had returned to its original temperature. Such an ideal assembly would be characterized by good repeatability. Failure to return to the original geometric configuration at the end of such temperature cycles adversely affects the performance of prior art transducer assemblies. The stick-slip movements caused by thermally induced shear forces discussed above in connection with FIGS. 8A–8E are the principal reason that prior art transducer assemblies fail to return to their original configurations after temperature cycles.

FIGS. 9A, 9B, and 9C illustrate how compliant ring 274 provides an improved support to electrode 130. FIG. 9A shows a magnified view of a portion of compliant ring 274. As shown, the compliant ring 274 is disposed between housing 240 and a shim 174 and the electrode 130 is disposed over shim 174. The force transfer member 172 is disposed above electrode 130 and pushes the electrode down towards shoulder 243 of housing 240. Preferably, the force transfer member is in line with the compliant ring as shown in FIG. 9A. As shown in FIGS. 9B and 9C, the compliant ring can flex (or deform) back and forth thereby allowing electrode 130 to move relative to the housing 240 in response to shear forces generated by heating or cooling the transducer assembly 200. As compliant ring 274 flexes, all contacting surfaces remain in stable contact and do not tend to slide against one another. That is, as the compliant ring 274 flexes, the lower end 274L of compliant ring 274 does not tend to slide against the groove 247 of housing 240, and instead remains in stable contact with the groove. Similarly, as the compliant ring 274 flexes, the upper end 274U of compliant ring 274 does not tend to slide against shim 174 (or against surface 136 of electrode 130 if the shim 174 is eliminated) and instead remains in stable contact with the shim.

In the prior art, thermally induced shear forces caused the electrode, shim, and housing to slide relative to one another. In contrast to the prior art, in transducer assemblies constructed according to the invention, thermally induced shear forces cause the compliant ring to deform. This deformation allows the differential thermal expansion to be absorbed without any slipping movements. Also, deformations of the compliant ring tend to be repeatable (i.e., they are not characterized by mechanical hysteresis). Therefore, transducer assemblies constructed according to the invention with the compliant ring provide good repeatability and tend to return to their original configurations at the conclusion of temperature cycles. Further, deformations of the compliant ring produce only minute changes in the geometric configuration and therefore transducer assemblies constructed according to the invention with the compliant ring also provide good stability. Also, the large force provided by wave washer 170 pushing down on electrode 130 makes transducer assembly 200 insensitive to large overpressure conditions. Transducer assembly 200 therefore provides (1) improved repeatability; (2) improved stability; and (3) insensitivity to large over pressure conditions. This combination of characteristics has not been provided by prior art transducer assemblies.

FIG. 10 shows a sectional view of a compliant ring 274 that has deformed in response to temperature induced shear forces generated within transducer assembly 200. As shown, when the compliant ring 274 is so deformed, the outer diameter LD of the lower end of compliant ring 274 becomes greater than the outer diameter UD of the upper end of the compliant ring 274. The compliant ring 274 could of course deform in the opposite direction (so that the upper diameter UD becomes greater than the lower diameter LD) in response to for example cooling of transducer assembly 200. The compliant ring 274 is preferably fabricated from a material that can resiliently flex or deform to these different diameters and then elastically return to its original ring-like shape (e.g., as shown in FIGS. 7A–D). Preferably, the outer diameter of the upper or lower ends (i.e., UD or LD as shown in FIG. 10) can change from the nominal diameter D of 1.8 inches by about 0.2% in response to thermally induced shear forces within transducer assembly 200 without damaging the compliant ring 274 and without causing sliding movements to occur.

As discussed above in connection with FIG. 4B, the thickness T of prior art shim 174 is typically about 0.006 inches and the cross-sectional width W of the shim is typically about 0.08 inches. The aspect ratio of the shim is equal to the thickness T divided by the cross-sectional width W, and a typical aspect ratio for a prior art shim 174 is much less than one. In the prior art, the shim 174 is the only support disposed between the electrode and the housing, and such a small aspect ratio for that support tends to make the electrode and housing move in a stick-slip fashion as discussed above in connection with FIGS. 8A–8E. Morphologically, shim 174 and compliant ring 274 are both characterized by an annular shape. Increasing the aspect ratio of shim 174 essentially morphologically transforms the shim into the compliant ring. When the aspect ratio of at least one of the supports between the electrode and the housing is about two or greater, the deformations of the support tend to become characterized by repeatable flexing movements (as discussed above in connection with FIGS. 9A–9C) rather than the stick-slip type movements of prior art shim 174. The primary reason for this is shown in FIGS. 8A–8E, 9B, and 9C. As shown in FIGS. 8A–8E, when the aspect ratio of the only support member between the electrode and the housing is too small, the forces required to flex the support are greater than the forces that cause slipping, so the thermally induced shear force results in slipping. However, as shown in FIGS. 9B and 9C, when the aspect ratio of at least one of the supports is sufficiently large, the forces required to flex the support are less than the forces that cause slipping, so the thermally induced shear force results in flexing (without slipping). Rather, all contacting surfaces remain in good contact throughout the deformation of compliant ring 174.

In the most preferred embodiments, the aspect ratio of the complaint ring is about three or greater. Although two or greater are preferred values for the compliant ring's aspect ratio, performance of the transducer assembly is improved when the aspect ratio of at least one of the supports between the electrode and the housing is as large as 1.0 or greater. The above-discussed preferred embodiment of the compliant ring 274 is characterized by an aspect ratio that is greater than two. In any particular transducer assembly implementation, the aspect ratio of the compliant ring 274 is preferably selected to insure that its deformations in response to temperature changes are smooth and repeatable. The cross-sectional width W is preferably selected to insure that the compliant ring 274 provides sufficient mechanical strength for reliably supporting the electrode 130.

Referring to FIG. 7D, the lower end 274L of compliant ring 274 is characterized by a curved cross section. Also, as shown in FIG. 5B, the groove 247 in housing 240 is also characterized by a curved cross section. The radius of the curvature in the lower end 274L of compliant ring 274 is preferably selected to be less than the radius of the curvature in the cross section of groove 247. This difference permits the compliant ring to tilt back and forth within groove 247 (e.g., as shown in FIG. 9B) without binding. The cross section of the upper end 274U of compliant ring 274 is flat with two rounded corners 274C. These rounded corners also permit the compliant ring to tilt back and forth against the electrode or a shim without binding. In one preferred embodiment, the radius of curvature of the cross section of the groove 247 is substantially equal to 0.02 inches, the radius of curvature of the cross section of the lower end 274L is substantially equal to 0.0075 inches, and the radius of curvature of the corners 274C on the cross section of the upper end 274U is substantially equal to 0.005 inches. It will be appreciated that the lower and upper ends 274L, 274U of the compliant ring 274 could alternatively be flat, or could for example both be flat with rounded corners (as in the case of the illustrated upper end 274U as shown in FIG. 7D). The curved cross sections and rounded corners improve the performance of compliant ring 274 but are not necessary for practice of the invention. In alternate embodiments it may be advantageous to provide the upper end 274U with another curved cross section (e.g., similar to that of the lower end 274L). However, it is difficult to manufacture compliant ring 274 with curved upper and lower ends while also preserving the thickness T dimension of the compliant ring.

In yet another embodiment, it may be advantageous to contour the compliant ring so that deformations of the ring compensate for changes in the geometric configuration caused by temperature changes. Such a compliant ring may improve the stability of the transducer assembly. For example, in response to heat the metallic compliant ring expands faster than the ceramic electrode and tends to minutely increase the axial distance between the diaphragm and the electrode. However, if the compliant ring is appropriately contoured, deformation of the ring that occurs in response to heating or cooling may tend to cancel out spatial changes resulting from varying expansion rates within the assembly. FIG. 7E shows a partially cross sectional view of such a compliant ring taken along the line 7D—7D as shown in FIG. 7A. In the example shown in FIG. 7E, the lower end of the ring is flat and the upper end 274U of the ring is tapered. The cross section of the upper end 274U includes an inner flat portion 274A and an outer curved portion 274B. FIG. 7F shows the compliant ring of FIG. 7E after deformation caused by heating the transducer assembly (i.e., deformation similar to the deformation illustrated above in connection with FIG. 9B) and FIG. 7G shows the compliant ring of FIG. 7E after deformation caused by cooling the transducer assembly (i.e., deformation similar to the deformation illustrated above in connection with FIG. 9C). Although not shown in FIGS. 7E–7G, it will be appreciated that in use the compliant ring is disposed between the annular support shoulder 243 and the electrode 130. As shown by FIG. 7F, when the transducer assembly is heated, the compliant ring deforms so that the electrode 130 tends to rest on the curved portion 247B rather than the flat portion 274A and this tends to reduce the spacing provided by the compliant ring between the annular support shoulder 243 and the electrode 130. This reduction in spacing tends to cancel the increase in the axial distance between the diaphragm and the electrode resulting from the differing expansion rates of the ceramic electrode and the metallic components of the transducer assembly. As shown in FIG. 7G, when the transducer assembly is cooled, the compliant ring deforms so that the electrode 130 rests on the inner edge of the upper end of the compliant ring and the outer edge of the lower end of the compliant ring contacts the annular support shoulder 243. This deformation of the compliant ring tends to increase the spacing provided by the compliant ring between the support shoulder 243 and the electrode 130. This increase in spacing tends to cancel the decrease in the axial distance between the diaphragm and the electrode resulting from differing expansion rates within the transducer assembly. It will be appreciated that the upper or lower end of the compliant ring could also be provided with other cross sectional shapes that are selected to cancel changes in the geometric configuration caused by differences in thermal expansion rates within the transducer assembly. For example, it may be advantageous for the lower end to be curved as in the compliant ring shown in FIG. 7D and for the upper end to be tapered as shown in FIG. 7E.

Figures 11A, 11B:
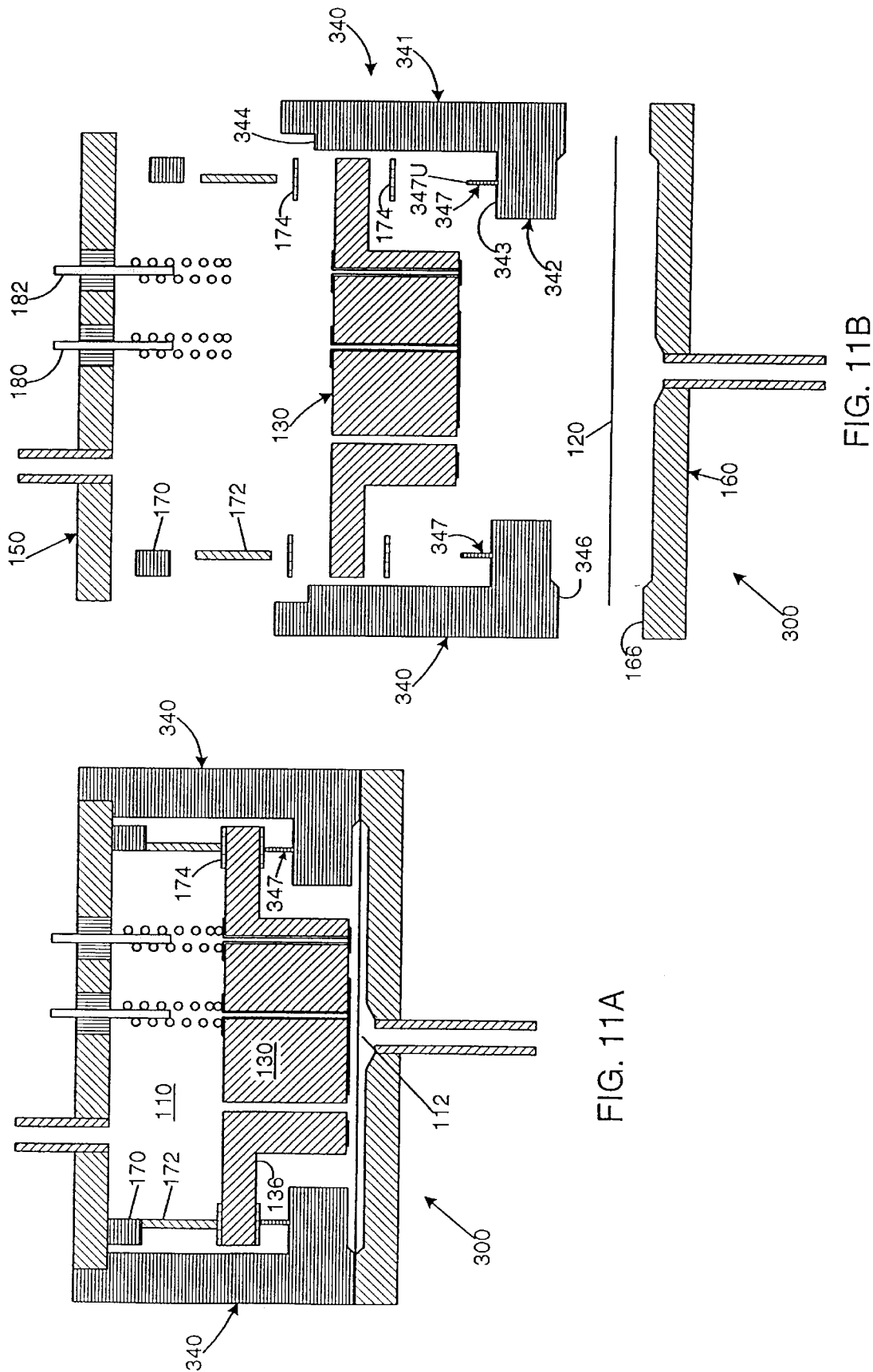
FIG. 11A shows a partially sectional view of another assembled pressure transducer assembly constructed according to the invention.
FIG. 11B shows a partially sectional exploded view of the transducer assembly shown in FIG. 11A.

FIG. 11A shows a partially sectional side view of another assembled transducer assembly 300 constructed according to the invention. FIG. 11B shows a partially sectional exploded view of transducer assembly 300. Transducer assembly 300 is very similar to transducer assembly 200. However, transducer assembly 300 includes a housing 340 rather than housing 240. Also, rather than including an independent compliant ring 274, transducer assembly 300 includes an integrated compliant ring 347 that is integral to housing 340. As with housing 240 of assembly 200, housing 340 includes a vertically extending portion 341 and a horizontally extending portion 342.

Figure 12A:
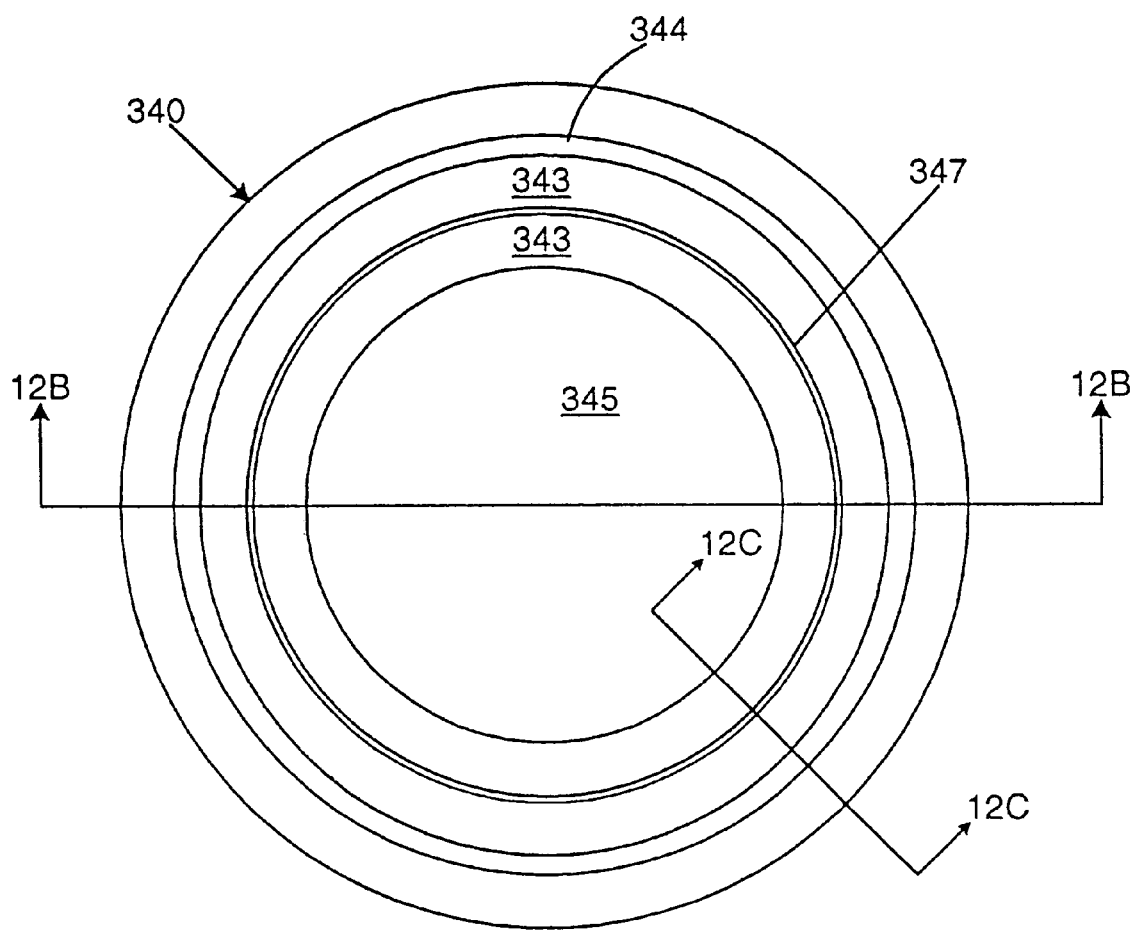
FIG. 12A shows a top view of the housing of the transducer assembly shown in FIGS. 11A and 11B.
Figure 12B:
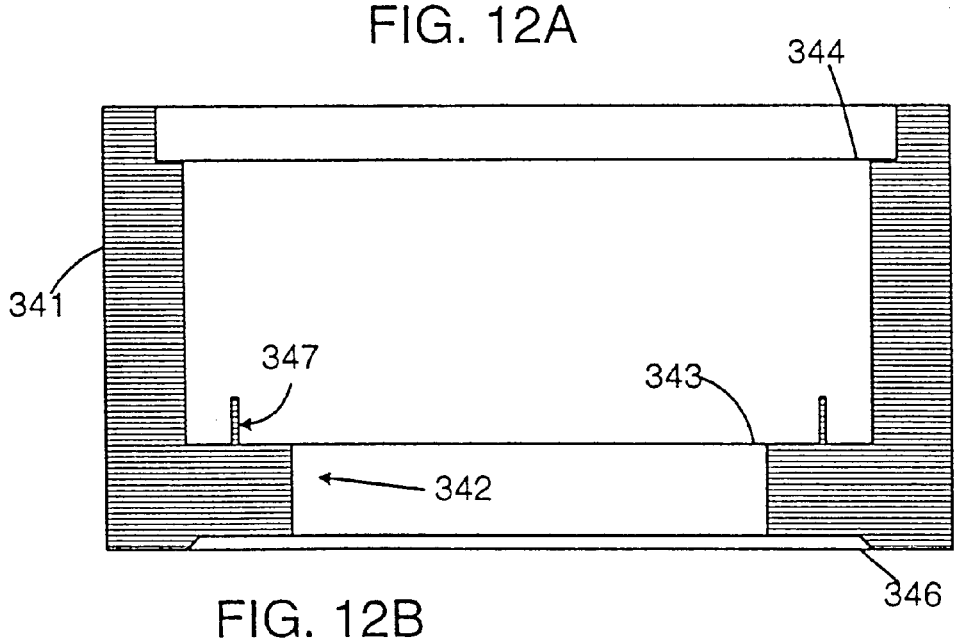
FIG. 12B shows a sectional view of the housing taken in the direction indicated by the line 12B—12B as shown in FIG. 12A.

FIG. 12A shows a top view of housing 340 and FIG. 12B shows a sectional view of housing 340 taken in the direction indicated by line 12B—12B as shown in FIG. 12A. FIG. 12C shows a partially sectional magnified view of a portion of housing 340 taken in the direction indicated by line 12C—12C as shown in FIG. 12A.

The upper portion of vertically extending portion 341 is stepped and defines an annular support shoulder 344. When transducer assembly 300 is assembled, the outer periphery of the lower surface of upper cover 150 rests on support shoulder 344.

The horizontally extending portion 342 defines a central aperture 345 and an annular upper surface 343. An annular shaped integrated compliant ring 347 extends or projects from the upper surface 343 of the horizontally extending portion 342. When transducer assembly 300 is assembled, the housing 340, the diaphragm 120, and the lower cover 160 are joined together so that the outer periphery of diaphragm 120 is trapped between a lower surface 346 of the housing 340 and the upper surface 166 of the lower cover 160.

When transducer assembly 300 is assembled, the wave washer 170 and the force transfer member 172 push the electrode 130 down towards the diaphragm 120. The upper end 347U of the integrated compliant ring 347 supports the electrode 130 and resists movement of the electrode 130 towards the diaphragm 120. The surface 346 of electrode 340 may rest directly on the upper end 347U of integrated compliant ring 347, or alternatively, a shim 174 may be disposed between electrode 130 and compliant ring 347 as shown in FIGS. 11A and 11B. As shown in FIG. 12C, 13A, and 13B, the upper end 347U of the compliant ring is preferably characterized by a curved cross section.

It will be appreciated that the integrated compliant ring 347 of assembly 300 supports electrode 130 in a fashion that is similar to the fashion in which the independent compliant ring 274 supports the electrode 130 in transducer assembly 200. As shown in FIGS. 13A and 13B, the integrated compliant ring 347 can tilt (or deform) back and forth in response to temperature induced shear forces within transducer assembly 300. Whereas the independent compliant ring 274 of transducer assembly 200 is separate from, and rests on, the housing 240, the integrated compliant ring 347 of transducer assembly 300 is formed as an integral part of housing 340. As shown in FIGS. 12C, 13A, and 13B the lower end 347L of compliant ring 347, is attached to and forms an integral part of the horizontally extending portion 342 of housing 340. The horizontally extending portion 342 and compliant ring 347 are preferably formed as a single monolithic construction. Alternatively, the lower end of compliant ring 347 may be fixed (e.g., by welding or bonding) to the horizontally extending portion 342. It will be appreciated that the independent compliant ring 274 may be essentially transformed into the integrated compliant ring by fixing the lower end of the independent compliant ring 274 to the housing.

In one preferred embodiment, the housing 340 is fabricated from stainless steel or Inconel, the outer diameter D of the integrated compliant ring 347 is substantially equal to 1.8 inches, the cross-sectional width W of the compliant ring 347 is substantially equal to 0.015 inches, and the thickness T of the compliant ring 347 is substantially equal to 0.085 inches. Also, in that embodiment, the cross section of the upper end 347U of compliant ring 347 is characterized by a radius of curvature that is substantially equal to 0.0075 inches. In other embodiments, the cross section of the upper end 347U could be characterized by other radii of curvature, could be flat, or could be flat with rounded corners as in the case of the upper end of the compliant ring 274.

Since certain changes may be made in the above apparatus without departing from the scope of the invention herein involved, it is intended that all matter contained in the above description or shown in the accompanying drawing shall be interpreted in an illustrative and not a limiting sense. As an example, all of the transducer assemblies discussed herein have included a wave washer 170 for generating a force that pushes the electrode down towards the diaphragm. In other embodiments, transducer assemblies constructed according to the invention could eliminate the wave washer and instead include another form of resilient or compressed element for generating a force that pushes the electrode down towards the diaphragm. As still another example, the groove 247 could be eliminated from housing 240 of transducer assembly 200. In such an embodiment, the independent compliant ring would rest directly on the shoulder 243 of housing 240, or on a shim or other spacer disposed between the compliant ring and the housing. It will be appreciated that the groove 247 is advantageous for locating the independent compliant ring at a desired location within transducer assembly 200. However, use of the groove is not necessary for use of the independent compliant ring 247. As still another example, the housings 240 and 340 have been described as being formed as a single monolithic construction. However, it will be appreciated that these housings could be formed from two or more distinct pieces that are joined together (e.g., by welding). For example, the horizontally extending portion may be formed separately from the vertically extending portion and these two portions may be welded together to form the housing. As another example, all of the transducer assemblies discussed herein have been characterized by circular symmetry. However, in other embodiments, the compliant ring could have non-circular (e.g., oval) shapes. The cross-sectional width W of a compliant ring characterized by non-circular symmetry is the radial distance between the outer and inner perimeters of the compliant ring, and the same is of course true for a compliant ring characterized by a non-circular symmetry. As still another example, FIGS. 14A–14F illustrate cross sections for a variety of alternate embodiments of the compliant ring. FIG. 14A shows the cross section for a compliant ring characterized by a flat end and a rounded end. Such a compliant ring has been discussed above in connection with FIGS. 7D, 12C, and 13A–13B. It will be appreciated that FIGS. 14B–14F illustrate cross sections for other embodiments of independent and integrated compliant rings that could be constructed according to the invention. It will further be appreciated that FIGS. 14A–14F are merely shown by way of example and that compliant rings could be constructed according to the invention having other cross sectional shapes as well.

What is claimed is:

1. A pressure transducer assembly comprising:
    (A) a body defining an interior cavity, the body having a first portion;
    (B) a diaphragm mounted in the body and dividing the interior cavity into a first chamber and a second chamber, a region of the diaphragm moving in a first direction in response to a pressure in the first chamber being higher than a pressure in the second chamber, the region of the diaphragm moving in a second direction opposite the first direction in response to the pressure in the second chamber being higher than the pressure in the first chamber;
    (C) an insulating member disposed in the first chamber;
    (D) a conductor disposed on the insulating member, the conductor and the diaphragm being characterized by a capacitance, the capacitance being representative of a difference between the pressure in the first chamber and the pressure in the second chamber;
    (E) a compressed member disposed in the first chamber, the compressed member generating a force that biases the insulating member towards the diaphragm;
    (F) a support member disposed between the first portion of the body and a portion of the insulating member, the first portion of the body resisting movement of the support member towards the diaphragm and the support member resisting movement of the insulating member towards the diaphragm, the support member being characterized by a thickness and by a cross-sectional width, a ratio of the thickness to the cross-sectional width being greater than one.

2. An assembly according to claim 1, wherein the ratio of the thickness to the cross-sectional width is greater than two.

3. An assembly according to claim 1, the support member resting on the first portion of the body.

4. An assembly according to claim 1, wherein the first portion of the body defines a groove, the support member resting in the groove.

5. An assembly according to claim 1 wherein a portion of the support member is fixed to the first portion of the body.

6. An assembly according to claim 1, wherein at least a portion of the body and the support member are formed as a single monolithic construction.

7. An assembly according to claim 1, wherein the support member is characterized by an annular shape.

8. A pressure transducer assembly comprising:
(A) a body defining an interior cavity and having a surface, the body further defining a groove in the surface;
(B) a diaphragm mounted in the body and dividing the interior cavity into a first chamber and a second chamber, a region of the diaphragm moving in a first direction in response to a pressure in the first chamber being higher than a pressure in the second chamber, the region of the diaphragm moving in a second direction opposite the first direction in response to the pressure in the second chamber being higher than the pressure in the first chamber;
(C) an insulating member disposed in the first chamber;
(D) a conductor disposed on the insulating member, the conductor and the diaphragm being characterized by a capacitance, the capacitance being representative of a difference between the pressure in the first chamber and the pressure in the second chamber;
(E) a support member disposed between the surface and the insulating member, the support member resisting movement of the insulating member towards the surface, a lower end of the support member resting in the groove.

9. An assembly according to claim 8, further comprising a compressed member disposed in the first chamber, the compressed member generating a force that biases the insulating member towards the diaphragm.

10. An assembly according to claim 8, wherein the support member is characterized by an annular shape.

11. An assembly according to claim 8, wherein the support member is characterized by a thickness and by a cross-sectional width, a ratio of the thickness to the cross-sectional width being greater than two.

12. A pressure transducer assembly comprising:
(A) a body defining an interior cavity, the body including a projection that extends in a first direction;
(B) a diaphragm mounted in the body and dividing the interior cavity into a first chamber and a second chamber, a region of the diaphragm moving in a second direction in response to a pressure in the first chamber being higher than a pressure in the second chamber, the region of the diaphragm moving in a third direction opposite the second direction in response to the pressure in the second chamber being higher than the pressure in the first chamber, the first direction being non-parallel to the diaphragm;
(C) an insulating member disposed in the first chamber;
(D) a conductor disposed on the insulating member, the conductor and the diaphragm being characterized by a capacitance, the capacitance being representative of a difference between the pressure in the first chamber and the pressure in the second chamber;
(E) a compressed member disposed in the first chamber, the compressed member generating a force that biases the insulating member towards the diaphragm, the projection resisting movement of the insulating member towards the diaphragm.

13. An assembly according to claim 12, wherein the projection is characterized by an annular shape.

14. An assembly according to claim 12, wherein the projection is characterized by a thickness and by a cross-sectional width, a ratio of the thickness to the cross-sectional width being greater than two.

15. An assembly according to claim 12, wherein the projection and at least one other portion of the body are formed as a single monolithic construction.

16. A pressure transducer assembly comprising:
(A) a body defining an interior cavity, the body having a first portion;
(B) a diaphragm mounted in the body and dividing the interior cavity into a first chamber and a second chamber, a region of the diaphragm moving in a first direction in response to a pressure in the first chamber being higher than a pressure in the second chamber, the region of the diaphragm moving in a second direction opposite the first direction in response to the pressure in the second chamber being higher than the pressure in the first chamber;
(C) an insulating member disposed in the first chamber;
(D) a conductor disposed on the insulating member, the conductor and the diaphragm being characterized by a capacitance, the capacitance being representative of a difference between the pressure in the first chamber and the pressure in the second chamber;
(E) means for generating a force, the force being applied to bias the insulating member towards the diaphragm;
(F) a support member disposed between the first potion of the body and a portion of the insulating member, the first portion of the body resisting movement of the support member towards the diaphragm, the support member resisting movement of the insulating member towards the diaphragm, the support member being characterized by a thickness and by a cross-sectional width, a ratio of the thickness to the cross-sectional width being greater than one.

17. An assembly according to claim 16, the support member resting on the first portion of the body.

18. An assembly according to claim 16, wherein the first portion of the body defines a groove, the support member resting in the groove.

19. An assembly according to claim 16, wherein a portion of the support member is fixed to a portion of the body.

20. An assembly according to claim 16, wherein at least a portion of the body and the support member are formed as a single monolithic construction.

21. An assembly according to claim 16, wherein the support member is characterized by an annular shape.

22. A pressure transducer assembly comprising:
(A) a body defining an interior cavity the body having a first portion;
(B) a diaphragm mounted in the body and dividing the interior cavity into a first chamber and a second chamber, a region of the diaphragm moving in a first direction in response to a pressure in the first chamber being higher than a pressure in the second chamber, the region of the diaphragm moving in a second direction opposite the first direction in response to the pressure in the second chamber being higher than the pressure in the first chamber, the diaphragm being substantially parallel to the surface;
(C) an insulating member disposed in the first chamber;
(D) a conductor disposed on the insulating member, the conductor and the diaphragm being characterized by a capacitance, the capacitance being representative of a difference between the pressure in the first chamber and the pressure in the second chamber;

(E) a compressed member disposed in the first chamber, the compressed member generating a force that biases the insulating member towards the diaphragm;

(F) an annular support member disposed between the first portion of the body and a portion of the insulating member, the first portion of the body resisting movement of the support member towards the diaphragm and the support member resisting movement of the insulating member towards the diaphragm, the support member being characterized by a thickness and by a cross-sectional width, a ratio of the thickness to the cross-sectional width being greater than one.

23. An assembly according to claim 22, wherein the first portion of the body defines a groove, the support member resting in the groove.

24. A pressure transducer assembly comprising:

(A) a body defining an interior cavity and a surface, the body being characterized by a first thermal coefficient of expansion;

(B) a diaphragm mounted in the body and dividing the interior cavity into a first chamber and a second chamber, a region of the diaphragm moving in a first direction in response to a pressure in the first chamber being higher than a pressure in the second chamber, the region of the diaphragm moving in a second direction opposite the first direction in response to the pressure in the second chamber being higher than the pressure in the first chamber, the diaphragm being substantially parallel to the surface;

(C) an insulating member disposed in the first chamber, the insulating member being characterized by a second thermal coefficient of expansion;

(D) a conductor disposed on the insulating member, the conductor and the diaphragm being characterized by a capacitance, the capacitance being representative of a difference between the pressure in the first chamber and the pressure in the second chamber;

(E) a compressed member disposed in the first chamber, the compressed member generating a force that biases the insulating member towards the diaphragm;

(F) an annular support member disposed between a portion of the surface and a portion of the insulating member, the support member resisting movement of the insulating member towards the diaphragm, the support member being characterized by a thickness and by a cross-sectional width, a ratio of the thickness to the cross-sectional width being sufficiently large so that shear forces generated in response to heating the assembly deform the annular support member prior to causing the annular support member to slide against the surface.

25. A pressure transducer assembly comprising:

(A) a body defining an interior cavity;

(B) a diaphragm mounted in the body and dividing the interior cavity into a first chamber and a second chamber, a region of the diaphragm moving in a first direction in response to a pressure in the first chamber being higher than a pressure in the second chamber, the region of the diaphragm moving in a second direction opposite the first direction in response to the pressure in the second chamber being higher than the pressure in the first chamber;

(C) an insulating member disposed in the first chamber;

(D) a conductor disposed on the insulating member, the conductor and the diaphragm being characterized by a capacitance, the capacitance being representative of a difference between the pressure in the first chamber and the pressure in the second chamber;

(E) a compressed member disposed in the first chamber, the compressed member generating a force that biases the insulating member towards the diaphragm;

(F) a support member disposed between a portion of the diaphragm and a portion of the insulating member, the support member resisting movement of the insulating member towards the diaphragm, the support member being characterized by a thickness and by a cross-sectional width, a ratio of the thickness to the cross-sectional width being greater than one, at least a portion of the body and the support member being formed as a single monolithic construction.

26. An assembly according to claim 1, wherein the insulator is characterized by a first coefficient of thermal expansion and the body is characterized by a second coefficient of thermal expansion, the first coefficient being different than the second coefficient.

27. An assembly according to claim 26, wherein the support member elastically deforms in response to heating and cooling the assembly thereby allowing the body to move with respect to the insulator.

28. An assembly according to claim 1, wherein the body is characterized by a first rate of thermal expansion and the insulator is characterized by a second rate of thermal expansion, the first rate being faster than the second rate.

29. An assembly according to claim 28, wherein the difference between the first and second rates causes the body and the insulator to exert a force on the support member when the assembly is heated from a first temperature to a second temperature, the support member deforming from a first geometric configuration to a second geometric configuration in response to the force.

30. An assembly according to claim 29, wherein cooling the assembly from the second temperature to the first temperature causes the support member to deform from the second geometric configuration to the first geometric configuration.

31. An assembly according to claim 1, wherein heating the assembly from a first temperature to a second temperature causes the body to move from a first position relative to the insulator to a second position relative to the insulator, the support member deforming without sliding in response to the movement of the body from the first position to the second position.

32. An assembly according to claim 31, wherein cooling the assembly from the second temperature to the first temperature causes the body to move from the second position relative to the insulator to the first position relative to the insulator, the support member deforming without sliding in response to the movement of the body from the second position to the first position.

* * * * *